(12) United States Patent
Gorodisher et al.

(10) Patent No.: US 7,806,420 B2
(45) Date of Patent: *Oct. 5, 2010

(54) HYDRAULIC DAMPER

(75) Inventors: Alex Gorodisher, Portland, OR (US);
Morris W. Boughton, Grass Valley, CA (US); Fima Dreff, Toronto (CA)

(73) Assignee: IQ Isolation Quality, Inc., Portland, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 12/363,005

(22) Filed: Jan. 30, 2009

(65) Prior Publication Data

US 2009/0127019 A1    May 21, 2009

Related U.S. Application Data

(60) Division of application No. 11/265,238, filed on Nov. 2, 2005, now Pat. No. 7,484,743, which is a continuation-in-part of application No. 10/649,605, filed on Aug. 28, 2003, now abandoned, said application No. 11/265,238.

(60) Provisional application No. 60/480,219, filed on Jun. 23, 2003, provisional application No. 60/630,160, filed on Nov. 23, 2004.

(51) Int. Cl.
*B62D 7/22* (2006.01)
(52) U.S. Cl. .................. 280/89.13; 280/90
(58) Field of Classification Search ........... 280/89.11, 280/89.12, 89.13, 90, 268; 180/417, 421, 180/422, 441
See application file for complete search history.

(56) References Cited

U.S. PATENT DOCUMENTS

| | | | |
|---|---|---|---|
| 3,870,335 A | 3/1975 | Schulz |
| 3,887,027 A | 6/1975 | Allison |
| 4,418,931 A | 12/1983 | Howard |
| 4,903,973 A | 2/1990 | Bray |
| 5,016,911 A | 5/1991 | Takehara et al. |
| 5,052,528 A | 10/1991 | Sullivan |
| 5,062,658 A | 11/1991 | Majeed |
| 5,351,790 A | 10/1994 | Machida |
| 5,360,230 A | 11/1994 | Yamada et al. |
| 5,477,947 A | 12/1995 | Schalles et al. |
| 5,536,028 A | 7/1996 | Howard |
| 5,598,337 A | 1/1997 | Butsuen et al. |
| 5,735,372 A | 4/1998 | Hamilton et al. |
| 6,086,060 A | 7/2000 | Berthold |
| 6,220,408 B1 | 4/2001 | Pradel et al. |
| 6,259,982 B1 | 7/2001 | Williams et al. |

(Continued)

*Primary Examiner*—Toan C To
(74) *Attorney, Agent, or Firm*—Gifford, Krass, Sprinkle, Anderson & Citkowski, P.C.; Douglas L. Wathen

(57) ABSTRACT

The present invention provides a damping system for use with a mechanism such as a steering system wherein one element moves relative to another element. The system includes a variable volume chamber, a collection chamber, and an inertia track providing fluid communication between the two chambers. A fluid is disposed in the chambers and the inertia track. A compliant tuning member is in fluid communication with the variable volume chamber. The damping system is capable of attenuating vibration at chosen frequencies without adding undesired damping at other frequencies. In the preferred embodiment, the damping system is used to attenuate steering wheel torsional vibration without increasing low frequency damping that would deteriorate steering feel.

26 Claims, 15 Drawing Sheets

U.S. PATENT DOCUMENTS

| | | |
|---|---|---|
| 6,272,947 B1 | 8/2001 | Howard |
| 6,416,061 B1 | 7/2002 | French et al. |
| 6,422,582 B1 * | 7/2002 | Howard ................. 280/90 |
| 6,427,986 B1 | 8/2002 | Sakai et al. |
| 6,520,519 B2 * | 2/2003 | Howard ............. 280/89.13 |
| 6,520,520 B2 * | 2/2003 | Howard ................. 280/90 |
| 6,530,585 B1 * | 3/2003 | Howard ............. 280/89.11 |
| 6,817,620 B1 | 11/2004 | Howard |
| 7,207,579 B1 | 4/2007 | Howard |
| 7,207,580 B2 | 4/2007 | Howard |

* cited by examiner

HYDRAULIC DAMPER

REFERENCE TO RELATED APPLICATIONS

This application is a divisional of U.S. patent application Ser. No. 11/265,238, filed Nov. 2, 2005, which is a continuation-in-part of U.S. patent application Ser. No. 10/649,605, filed Aug. 28, 2003, now abandoned, which claims priority to U.S. Provisional Patent Application Ser. No. 60/480,219, filed Jun. 30, 2003. U.S. patent application Ser. No. 11/265,238, filed Nov. 2, 2005, also claims priority to U.S. Provisional Patent Application Ser. No. 60/630,160, filed Nov. 23, 2004, the entire content of all of which are incorporated herein by reference.

FIELD OF THE INVENTION

The present invention relates to steering arrangements and in particular to steering arrangements, which can provide tuned damping capable of handling large displacements.

BACKGROUND OF THE INVENTION

Existing vehicle wheel steering arrangements include a steering gear, tie rods, control arms, control arm bushings, and wheels. The frictional damping within the steering gear affects both steering feel, which is generally at frequencies less than 2 Hz, and the higher frequency chassis modes, which are typically in the range of 10-15 Hz.

Chassis modes can cause vibration to propagate through the steering gear and result in oscillations of the steering wheel, also referred to as "steering nibble". Steering nibble is a significant issue for the automotive industry.

Previous steering arrangements relied heavily on frictional damping within the steering gear to attenuate steering nibble energy. This arrangement provides some chassis mode energy dissipation; however, the attenuation may be insufficient because frictional damping becomes less effective at higher frequencies.

Also, the automotive industry trend has been to reduce frictional damping, because decreasing 0-2 Hz damping positively affects customer perceived steering feel. Therefore, any arrangement that relies on increased frictional damping to control 10-15 Hz vibrations will negatively impact steering feel.

Some vehicle steering arrangements have employed a common viscous damper, or dashpot, between the steering gear and tie rod, to add damping to the system to attenuate steering nibble. Viscous devices provide damping across a broad frequency range, even though increased damping is only desired at the steering nibble frequency. Increased damping at low frequencies degrades steering feel, while increased damping at high frequencies transmits more vibration into the passenger compartment. The viscous damper provides this compromised performance as well as a significant cost increase.

SUMMARY OF THE INVENTION

The present invention provides a variety of designs for damping systems for use with a variety of mechanisms or systems that require damping. A first preferred embodiment of the present invention provides a damping system for use with a steering system of the type having a steering gear and a tie rod which moves toward and away from the steering gear to cause movement of a vehicle wheel. The damping system includes a boot defining a working chamber. The boot has a first portion connected to the steering gear and a second portion connected to the tie rod such that movement of the tie rod toward the steering gear reduces the volume of the working chamber and movement of the tie rod away from the steering gear increases the volume of the working chamber. An inertia track has a first end in fluid communication with the working chamber of the boot and an opposed second end. A collection chamber is in fluid communication with the second end of the inertia track. A fluid is disposed in the working chamber, the inertia track, and at least a portion of the collection chamber. A compliant tuning member is in fluid communication with the working chamber. The tuning member is movable to accommodate high frequency changes in the volume of the working chamber.

In some versions, the boot is a rolling boot and in some versions the compliant tuning member is a diaphragm. The system may further include a diaphragm housing in fluid communication with the working chamber, with the diaphragm forming a portion of the diaphragm housing. In additional versions, the boot has a bulging stiffness and the diaphragm has a deflection stiffness that is substantially lower than the bulging stiffness of the boot. The compliant tuning member may form at least a part of the boot. The compliant tuning portion of the boot may have a stiffness substantially lower than the remainder of the boot, which may be fiber reinforced. The collection chamber may be a chamber that is at least partially filled with gas.

In further versions of the first embodiment, the steering gear is of the type further having a second tie rod which moves towards and away from the steering gear. The system further includes a second boot defining a second working chamber. The second boot has a first portion connected to the steering gear and a second portion connected to the second tie rod such that movement of the tie rod toward the steering gear reduces the volume of the second working chamber and movement of the tie rod away from the steering gear increases the volume of the working chamber. The second end of the inertia track is in fluid communication with the second boot such that the second boot forms the collection chamber. Alternatively, in a system including a second boot, a second inertia track and a second collection chamber may be provided, along with a second compliant tuning member. The inertia tracks may have the same cross-sectional area in length, or the area and/or lengths may be different from each other.

According to a further embodiment of the present invention, a damping system is provided for use with a steering system of the type having a steering gear and a tie rod which moves toward and away from the steering gear to cause movement of a vehicle wheel. The damping system is tuned to at least partially damp a chosen frequency. The system includes a variable volume chamber in mechanical communication with the steering gear and the tie rods such that movement of the tie rod in a first direction with respect to the steering gear reduces the volume of the chamber and movement of the tie rod in a second direction with respect to the steering gear increases the volume of the chamber. The system further includes a collection chamber and an inertia track having one end in fluid communication with the variable volume chamber and an opposed second end in fluid communication with the collection chamber. A fluid is disposed in the variable volume chamber, the inertia track and at least a portion of the collection chamber. A compliant tuning member is in fluid communication with the chamber. The cross-sectional area and length of the inertia track and the deflection stiffness of the compliant tuning member are chosen such that the system damps movement of the tie rod relative to the steering gear generally at the chosen frequency.

According to yet a further embodiment of the present invention, a damping system is provided for use with a mechanism having a first element which moves toward and away from a second element. The damping system is tuned to at least partially damp a chosen frequency. The system includes a variable volume chamber in mechanical communication with the mechanism such that movement of the first element in a first direction with respect to the second element reduces the volume of the chamber and movement of the first element in a second direction with respect to the second element increases the volume of the chamber. The system further includes a collection chamber and an inertia track having a first end in fluid communication with the variable volume chamber and an opposed second end in fluid communication with the collection chamber. A fluid is disposed in the variable volume chamber, the inertia track and at least a portion of the collection chamber. A volume of fluid is displaced into or from the variable volume chamber by movement of the first element relative to the second element. The volume displaced per unit of movement is defined as $dV/dx$. An actual fluid mass for the inertia track is given by the formula: actual fluid mass=(cross-sectional area)×(length)× fluid density. The system has an effective mass given by the formula: system effective mass=$((dV/dx)/(\text{cross-sectional area}))^2$×actual fluid mass. A compliant tuning member is in fluid communication with the chamber. The compliant tuning member has a deflection stiffness and an area. The system has a system effective stiffness given by the formula: system effective stiffness=$((dV/dx)/(\text{area of compliant member}))^2$× deflection stiffness. The system has a resonant frequency given by the formula: system resonant frequency=(system effective stiffness/system effective mass)$^{1/2}$. The cross-sectional area in length of the inertia track and the deflection stiffness of the compliant tuning member are chosen such that the system resonant frequency is generally at the chosen frequency. Some versions of this embodiment are designed for use with a steering system, wherein the first element is a tie rod and the second element is a steering rack. The system may further include a boot that defines the variable volume chamber, with the boot having a first portion connected to the steering rack and a second portion connected to the tie rod. The boot may be a rolling boot. In some versions, the system effective mass is at least 100 times the actual fluid mass, and in further versions the system effective mass is at least 200 times the actual fluid mass. The system resonant frequency may be in the range of 10-25 hertz.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
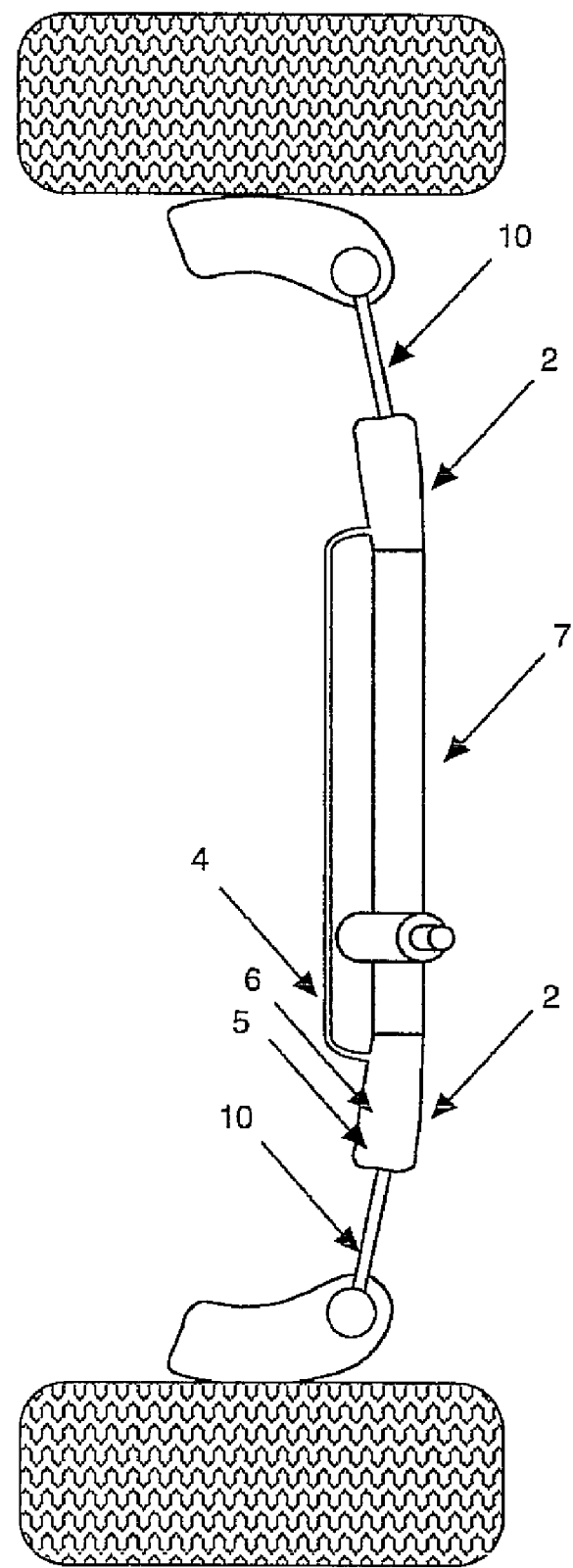
FIG. 1 is a schematic of a vehicle steering arrangement having an integrated hydraulically tuned damping system according to an embodiment of the invention.
Figure 2:
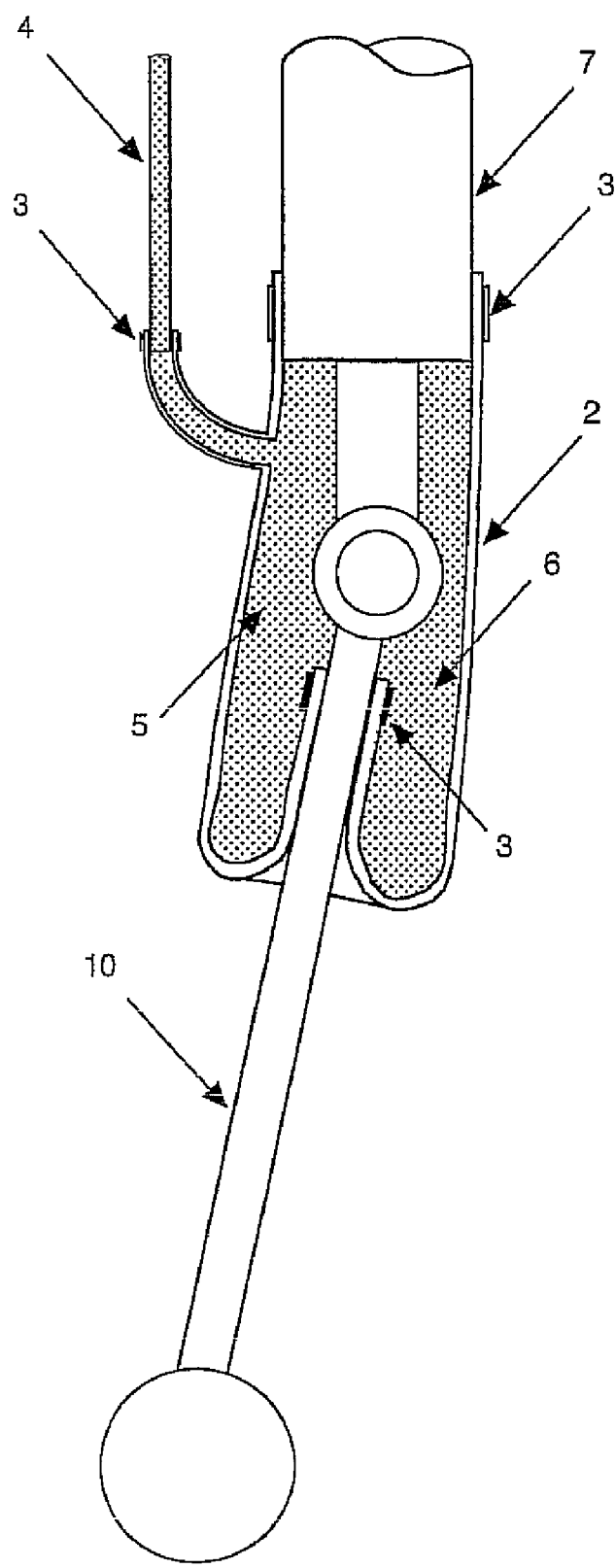
FIG. 2 is a sectional view through one of the boots associated with the integrated hydraulically tuned damping system of FIG. 1.

A modified vehicle steering suspension arrangement is shown schematically in FIG. 1. This steering arrangement includes a hydraulically tuned steering damping system, which is comprised of two rolling boots 2 connected by an inertia track 4 and filled with working fluid 6. The hydraulically tuned steering damping system, and the new rolling boots 2 in particular, are shown in greater detail in FIG. 2.

The two rolling boots 2 replace the common dust boots found on steering gears, whose function was to prevent dirt from entering the steering gear 7. The inertia track 4 may replace the common air equalization tube found on steering gears, whose function is to prevent the air trapped with the dust boots from building up pressure.

The hydraulically tuned steering damping system works on some similar principles as existing hydromounts, however, it is designed to accommodate much greater displacements than hydromounts and does not add significant static stiffness to the systems as hydromounts do. The rolling boots 2 accommodate displacements greater than 25 mm without adding significant low frequency stiffness to the system.

The steering system is designed such that desired tie-rod 10 lateral displacements are caused by driver-controlled rotational steering wheel inputs. Similarly, undesirable energy can be transmitted in the reverse direction: from chassis resonances into the tie-rods 10, ultimately resulting in a rotation of the steering wheel.

When the tie-rod 10 is laterally displaced, it causes one end of the boot 2 to move with it because they are clamped 3 together. As the end of the boot 2 moves inward toward the steering gear 7, it rolls further under itself, making the working chamber 5 smaller in volume. This volumetric change applies pressure to the working fluid 6 and causes movement of the working fluid 6 through the inertia track 4.

Thus, the working fluid 6 is forced to move through the inertia track 4 between the contracting working volume 5 and into the expanding volume within the boot on the opposite side of the steering gear. The total combined volume of the two boots is constant; therefore there is no significant pressure increase at low frequencies. For this case, the working fluid 6 is free to move through the inertia track 4 with low resistance. In this embodiment, each boot serves as a collection chamber for the opposite boot.

The inertia track 4 connects the contracting working volume 5 with the expanding volume on the opposite side. Structurally, the inertia track is a tube or passage that allows the flow of fluid there through. The length of the inertia track 4 and the size thereof contribute to the tuning and effectiveness of the hydraulically tuned steering damping system. The inertia track 4 is designed such that the mass of the fluid in the inertia track is scaled up to act as a large effective mass. This mass scaling effect is caused by the impedance of the fluid that must flow from the relatively large working chamber's cross-section into the small nozzle-like inertia track's cross-section.

Figure 3:
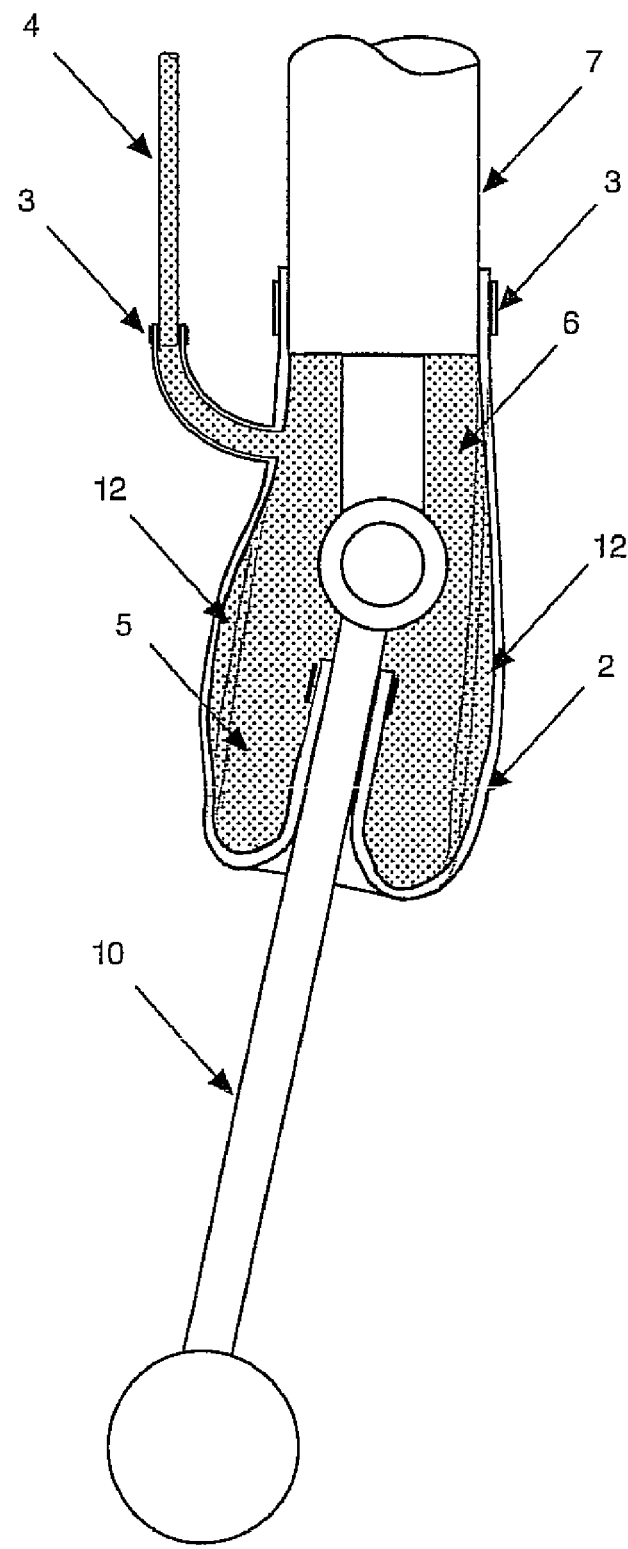
FIG. 3 is a sectional view through one of the boots associated with the integrated hydraulically tuned damping system demonstrating the distortion that yields its bulging stiffness.

FIG. 3 shows the distortion 12 that occurs in the boot 2 when the working fluid 6 is not free to flow through the inertia track 4. This distortion 12 is defined by a bulging stiffness and effectively functions as a deformable diaphragm, similarly to how the bulging stiffness of a traditional hydromount functions as a deformable diaphragm. The portion of the boot that acts as a deformable diaphragm in this embodiment may also be referred to as a compliant tuning member. As will be clear to those of skill in the art, the compliant tuning member is in fluid communication with the working chamber 5. The diaphragm or compliant tuning member may take other forms, some of which will be described later.

It is the combination of the movement of fluid through the inertia track 4 and the bulging distortion 12 (which defines an analogous diaphragm) that provide the tunable response characteristics of this embodiment of a hydraulically tuned steering damping system. The resonant frequency of any single degree of freedom tuned mass absorber is a simple function of the absorber mass and the stiffness of the spring on which it is mounted. The hydraulically tuned damping system's resonant frequency is similarly a function of the scaled effective fluid mass and the compliant member's stiffness. The scaled effective fluid mass also affects the total output damping of the damping system at the resonant frequency. Below the resonant frequency, output damping is low because fluid is free to flow through the inertia track 4. Above the resonant frequency, output damping is low because the compliant tuning member 12 is compliant for the lower vibration amplitudes seen at high frequencies.

The scaled effective fluid mass is one of the primary design considerations that affect the amount of damping achieved at the resonant frequency. The effective mass is increased when the working chamber's 5 cross sectional area is increased or when the inertia track's 4 cross sectional area is decreased. Also, since a longer inertia track 4 causes more fluid mass to be in the inertia track 4, increasing inertia track 4 length is another design method to increase the total effective mass and therefore the system's output damping.

As an example, a hydraulically tuned damping system achieved 10 Ns/mm of output damping at 15 Hz. To achieve this level of damping the scaled effective fluid mass is approximately 40 Kg. One way to achieve this effective mass would be to have a working chamber cross-section area of 2000 $mm^2$, an inertia track that has cross section area of 70 $mm^2$ and length of 80 mm. Of course, the compliant member's stiffness affects the frequency at which this damping peak would occur, and to tune a 40 Kg mass to resonate near 15 Hz, the system's stiffness is approximately 400 N/mm.

These damping characteristics differ drastically from the traditional steering arrangements' non-tunable damping, which is caused by friction between the stationary steering gear housing 7 and the internal components that move together with the tie-rods 10. Increased frictional damping can help alleviate 10-15 Hz lateral tie-rod vibration energy causing nibble, but increased friction is more influential in increasing damping in the 0-2 Hz range, which the driver perceives as poor steering feel.

Returning to FIG. 2, it can be appreciated that the boot 2 behaves very differently depending on whether the working fluid 6 is allowed to flow freely through the inertia track 4 or not. If the fluid 6 is free to move, required volumetric changes are easily accommodated by the boot's 2 rolling action without any significant stiffness effect. If the fluid 6 is trapped in the inertia track 4, volumetric changes cannot be easily accommodated and the boot 2 must bulge 12, with significant stiffness effect upon the system.

Figure 4A:
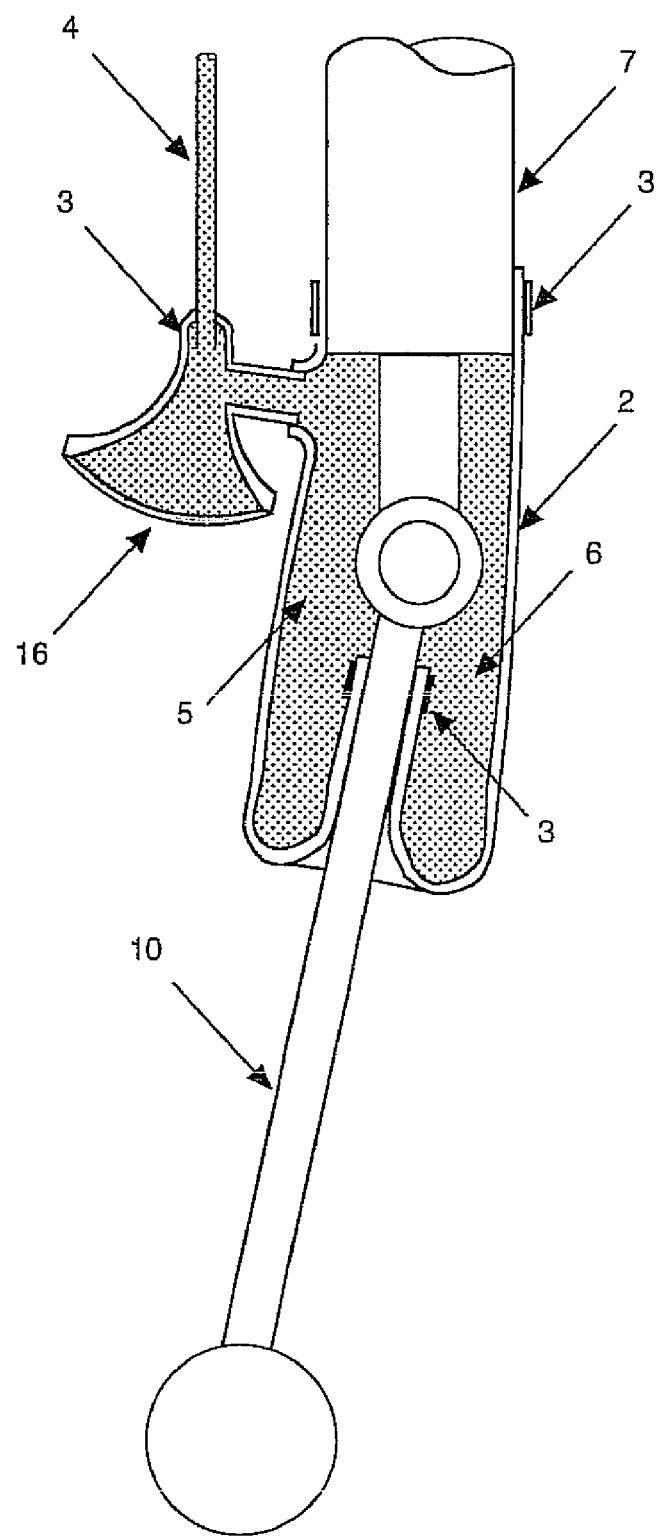
FIG. 4a is a sectional view through a boot of an alternate construction having a separate diaphragm and associated with the integrated hydraulically tuned damping system.
Figure 4B:
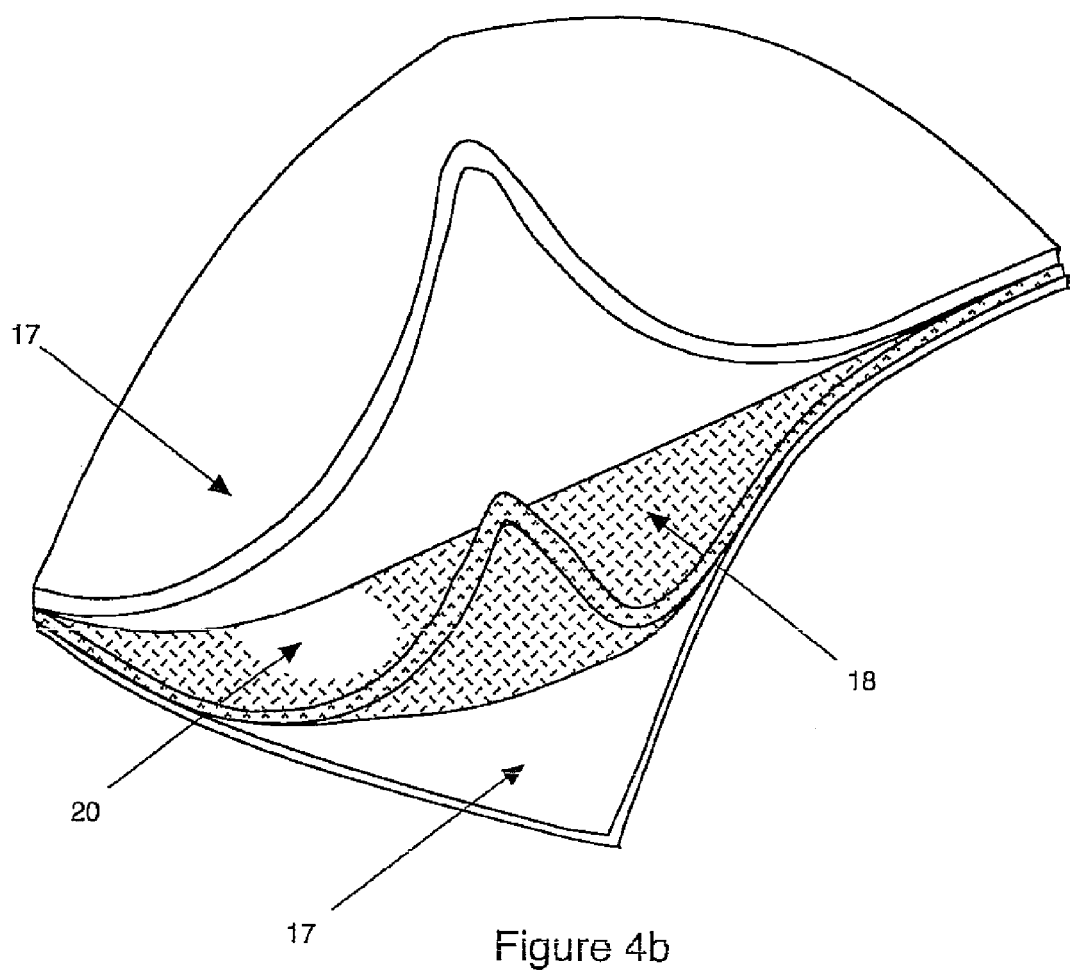
FIG. 4b is a sectional view through a fiber-reinforced boot and integrated diaphragm.

FIG. 4a shows an alternate hydraulically tuned steering damping system, which has a separate deformable diaphragm 16 attached to the structure that houses the boot 2. In this system, the bulging stiffness of the boot 2 is designed orders of magnitude higher than the separate deformable diaphragm 16, so that the compliance of the diaphragm 16 controls the bulging stiffness used to tune the damping frequency of the system. For example, a typical diaphragm stiffness would be 100 N/mm. By reinforcing the boot material 17 with a fiber mesh 18 as shown in FIG. 4b, the boot 2 can achieve a bulging stiffness of over 1000 N/mm. The total bulging stiffness of these two components together would be dominated by the most compliant member, the diaphragm. Therefore, in this example, the combined bulging stiffness would still be close to 100 N/mm and the reinforced boot's bulging stiffness would have little stiffness effect. The deformable diaphragm of this embodiment may be said to form part of a diaphragm housing, which is in fluid communication with the working chamber 5 of the rolling boot 2.

FIG. 4b also shows that a diaphragm can be designed into the boot itself by not reinforcing a desired material section 20 with fiber. This non-reinforced section 20 would be more compliant than the fiber-reinforced boot 18 and could also be designed with a thinner wall section than the rest of the boot. Similarly to the previously described external diaphragm, this integrated diaphragm 20 could be designed to have a stiffness of a typical diaphragm, approximately 100 N/mm, and would be the controlling system compliance when paired with a reinforced boot's bulging stiffness of over 1000 N/mm.

It should also be noted that the present invention may utilize boots or bellows with configurations different than the preferred rolling boot. For example, a more traditional pleated bellows or boot may be used in some applications.

Figure 5A:
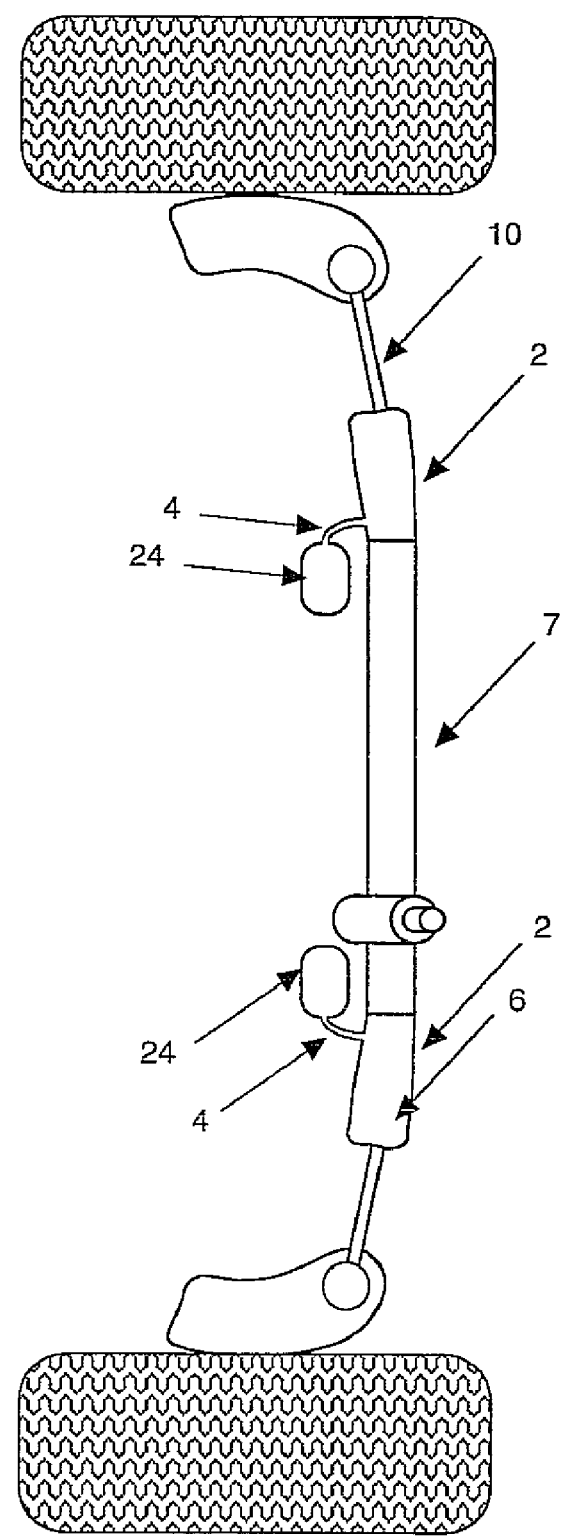
FIG. 5a is a schematic of a vehicle steering arrangement having an integrated hydraulically tuned damping system of an alternate construction, where each boot is connected to its own separate inertia track and fluid collection chamber.
Figure 5B:
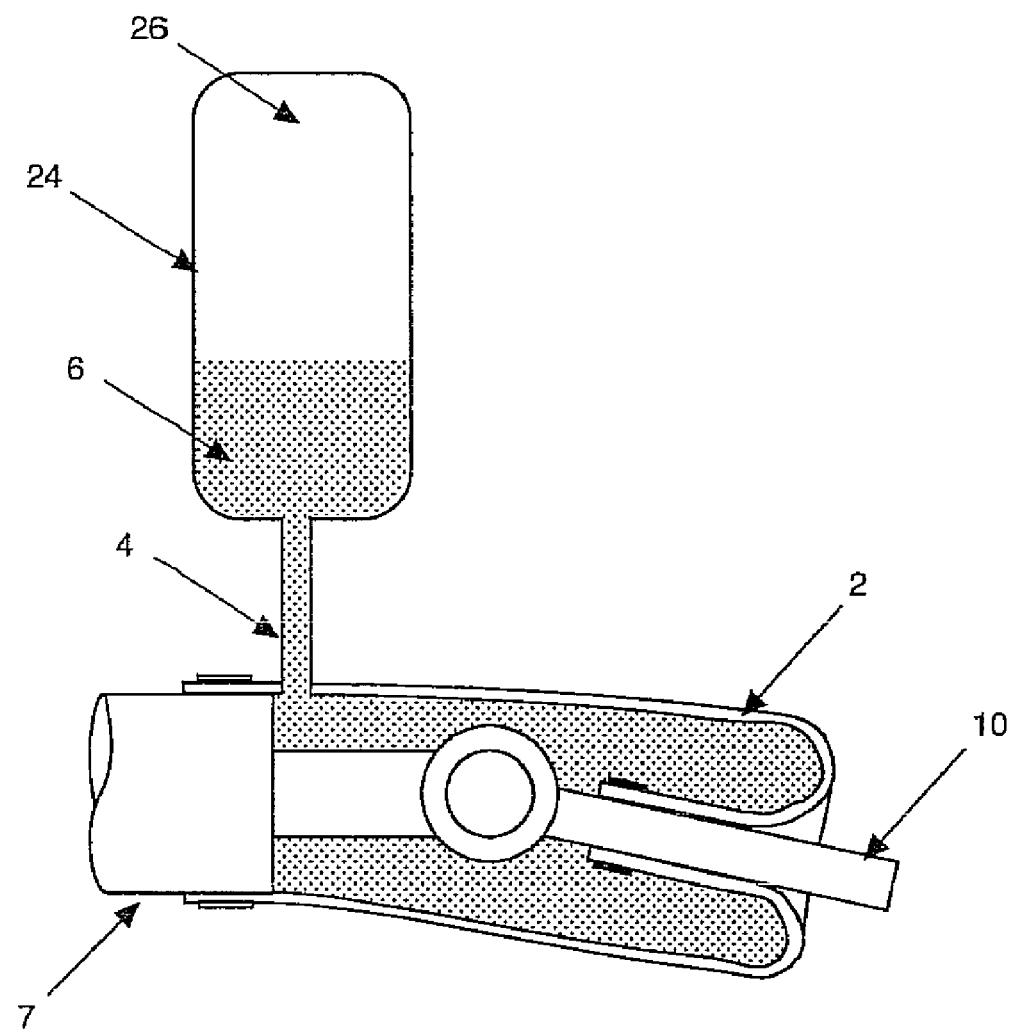
FIG. 5b is a sectional view through a boot of an alternate construction where the boot is connected to its own separate inertia track and fluid collection chamber.

FIGS. 5a and 5b show another alternate hydraulically tuned steering damping system, which has separate inertia tracks 4 for each boot and external fluid collection chambers 24 for each inertia track. Each collection chamber 24 is partially filled with a low pressure gas 26 which accommodates fluid 6 volumetric changes and functions similarly to the bellows of a traditional hydromount. Each inertia track 4 can be tuned to attenuate an individual frequency or they can be tuned to attenuate the same frequency. This system can use either the boot's bulging stiffness 12 or a separate deformable diaphragm, such as 16 or 20, to achieve the required bulging stiffness. In the version of the system shown in FIG. 1, each boot 2 serves as a collection chamber for the opposite boot. In FIGS. 5*a* and 5*b*, the external collection chambers 24 serve this purpose.

Figure 5C:
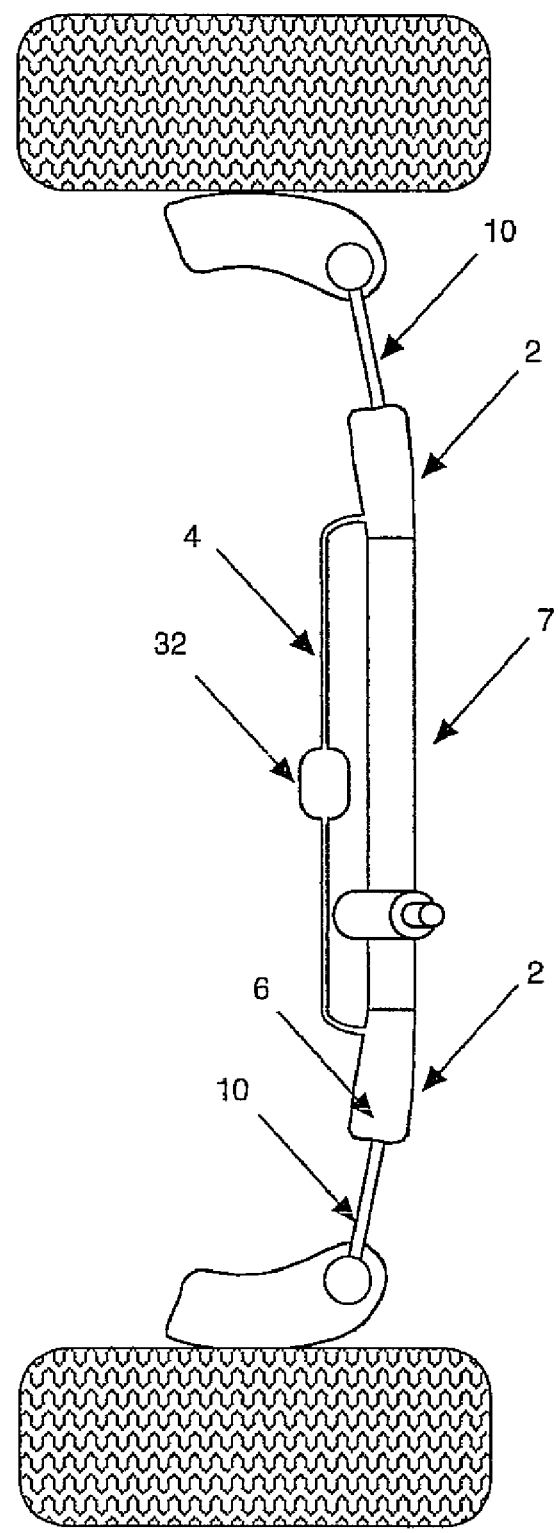
FIG. 5c is a schematic of a vehicle steering arrangement having an integrated hydraulically tuned damping system of an alternate construction, where both boots are connected to a common auxiliary fluid collection unit.
Figure 5D:
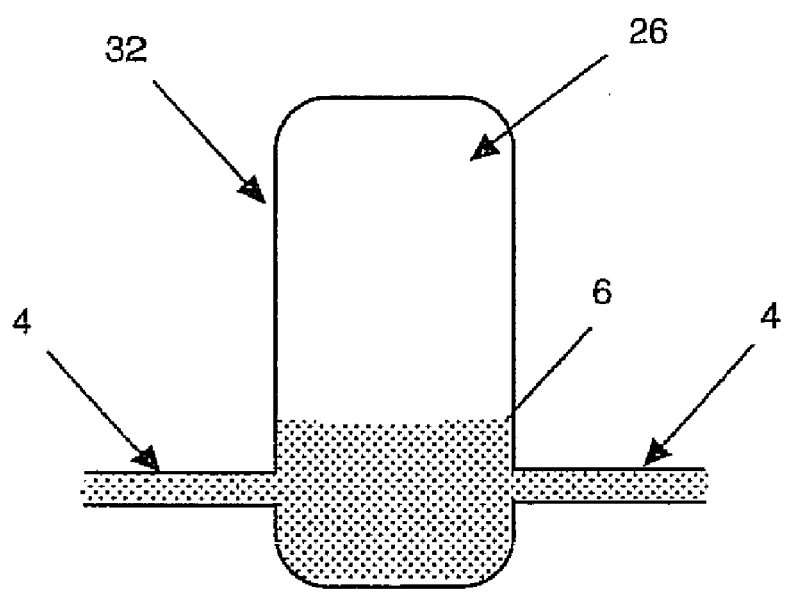
FIG. 5d is a sectional view through a version of a common auxiliary fluid collection unit for use with the present invention.

FIGS. 5*c* and 5*d* show another alternate hydraulically tuned steering damping system, which has separate inertia tracks 4 for each boot, but one collection chamber 32. Each inertia track 4 can be tuned to attenuate an individual frequency or they can be tuned to attenuate the same frequency. This system can be used with either the boot' bulging stiffness 12 or a separate deformable diaphragm 16 or 20 to achieve the required bulging stiffness.

Figures 6A, 6B, 6C:
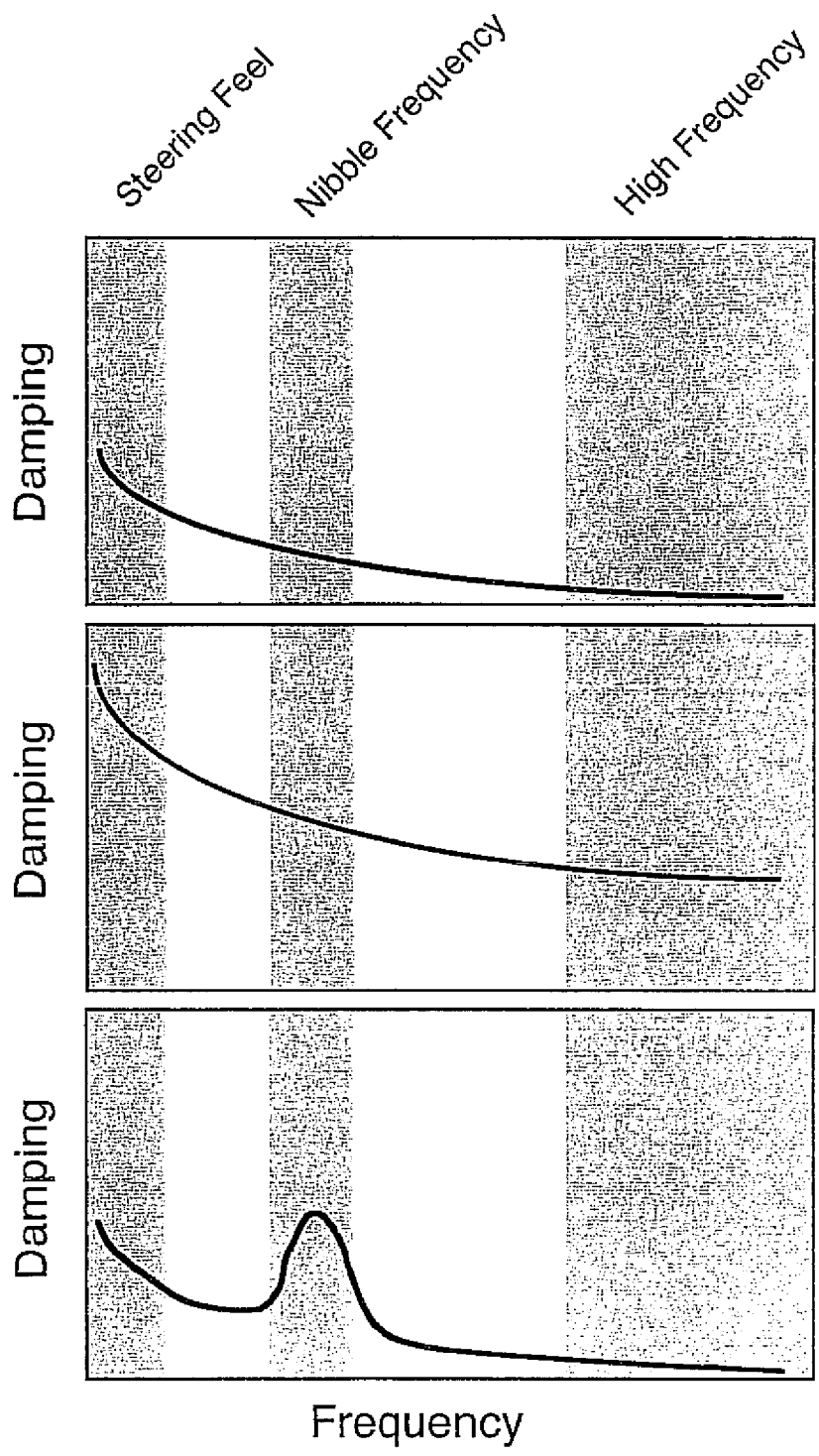
FIG. 6a shows the frequency damping characteristics of a steering gear with low internal frictional damping.
FIG. 6b shows the frequency damping characteristics of a steering gear with high internal frictional damping.
FIG. 6c shows the frequency damping characteristics of a hydraulically tuned damping system integral to the steering gear.

FIGS. 6*a* through 6*c* show different systems and their damping vs. frequency characteristics. In each of the diagrams, different frequency ranges are shown which are particular concerns. The low frequency range controls the steering feel characteristics, typically from 0-2 Hz, with the chassis modes causing steering nibble shown in a band of about 10-15 Hz. The next band of interest is much higher and has to do with high frequency excitation and this is found at the right end of the graphs.

FIG. 6*a* shows the performance of a steering gear designed with low frictional damping. With this system, there is little damping at low frequencies to disturb steering feel, but also little damping to attenuate steering nibble.

FIG. 6*b* shows the performance of a steering gear designed with high frictional damping. With this system, there is sufficient damping to control steering nibble, but too much damping at low frequencies, thereby causing degraded steering feel.

FIG. 6*c* shows the performance of a hydraulically tuned steering damping system that is designed to have peak damping for the steering nibble mode. As can be seen, the structure provides minimal damping in the low frequency range and therefore has minimal impact on steering feel.

Figure 7:
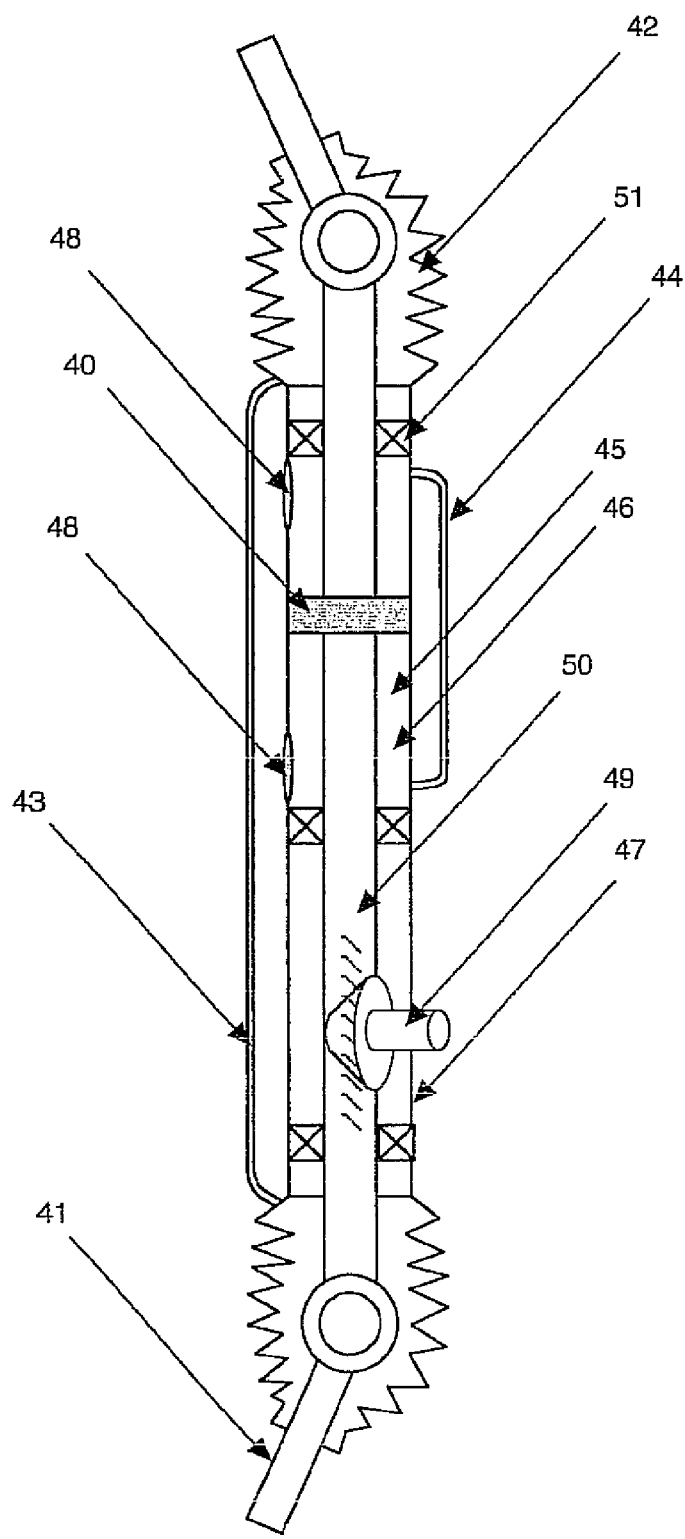
FIG. 7 is a schematic of a vehicle steering arrangement in which a hydraulically tuned damping system has been integrated within the steering gear housing.

FIG. 7 shows an alternate hydraulically tuned steering damping system, which is integrated inside the structure of the steering gear, thereby potentially realizing additional cost savings. The system contains dust boots 42, an air equalization tube 43, a pinion 49, and a steering gear housing 47 and its internal components. The steering gear contains a piston 40 that slides with the rack 50. Bearings 51 constrain the rack 50 within the gear housing 47 and fluid is sealed. A piston 40 defines two variable volume chambers 45 within the gear housing 47 and moves the working fluid 46 through the inertia track 44 and between the volume chambers 45 when there is relative motion between the tie rod 41 and the steering gear housing 47. Compliant tuning members, in the form of diaphragms 48, are integrated into the gear housing and are in fluid communication with the volume chambers 45. The compliance of the diaphragm 48 controls the bulging stiffness used to tune the damping frequency of the system. As will be clear to those of skill in the art, the integrated system of FIG. 7 may take other forms than illustrated.

Figure 8:
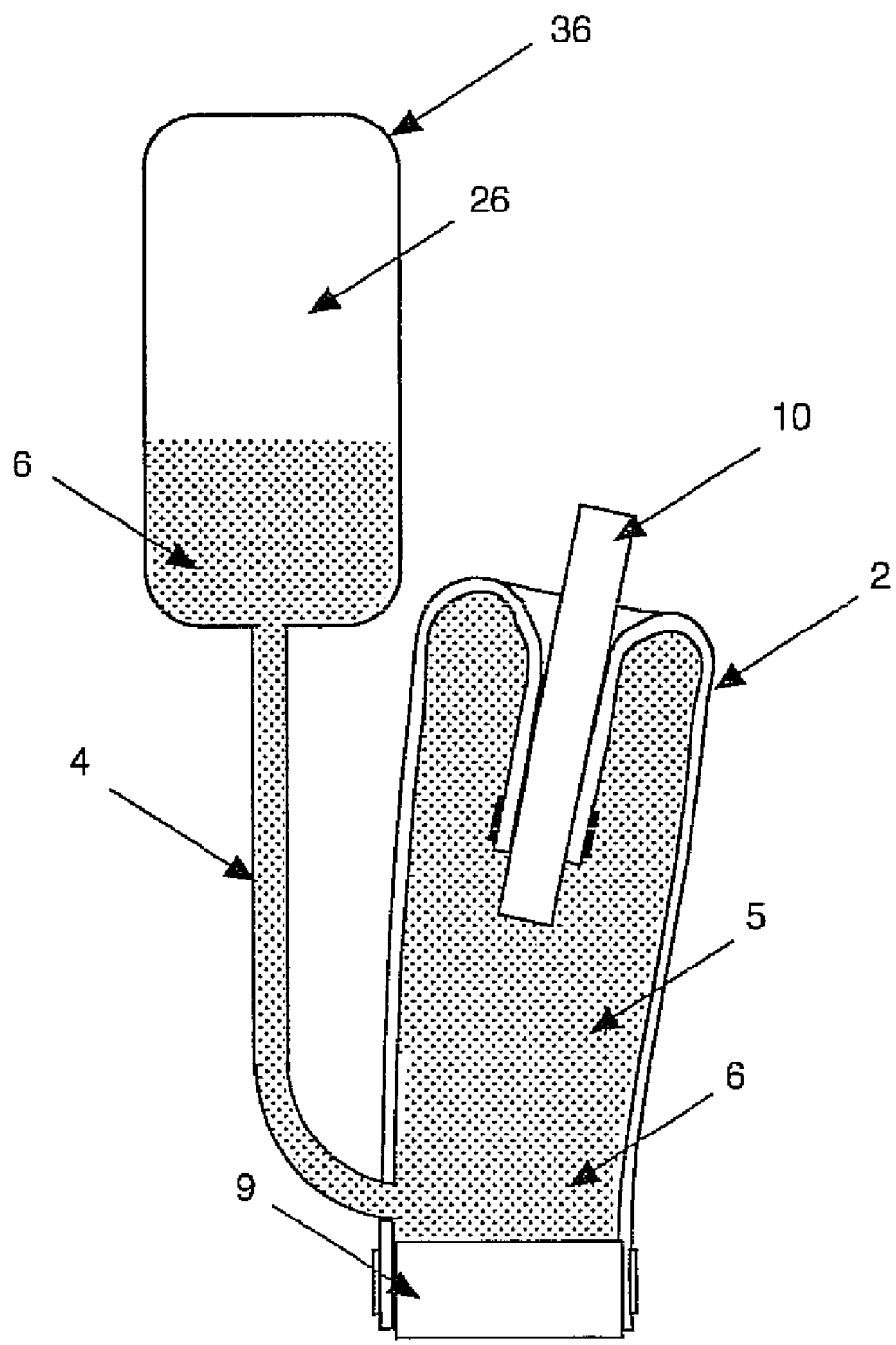
FIG. 8 is a schematic of the stand-alone hydraulically tuned damping system, which can be used for general application to attenuate frequency-specific vibration.

FIG. 8 shows a stand-alone hydraulically tuned damping system, which can be used to attenuate vibration for other general applications. A rolling boot 2 attached to a housing 9 defines a variable volume chamber 5, which is filled with a working fluid 6. The working fluid is displaced through an inertia track 4 and into a secondary collection chamber 36. A low pressure gas 26 inside of the collection chamber 36 accommodates fluid 6 volumetric changes. This system can use either the boot's bulging stiffness 12 or a separate deformable diaphragm 16 or 20 to achieve the required bulging stiffness.

It is also possible with these designs to employ technologies found in existing hydromounts such as multiple inertia tracks, floating diaphragms and other amplitude decoupling devices, high damped diaphragms, etc., which allow the designer to tailor the stiffness frequency curve of the damper.

Some embodiments of the hydraulically tuned steering damping system utilize a rolling boot 2 design rather than the traditional molded rubber shoulder design used in existing hydromount technology. This design differs functionally from the existing technology in that the main rubber element of a traditional hydromount provides significant stiffness to the system whether or not fluid is allowed to flow freely through the inertia track. At high frequencies when fluid is trapped in the inertia track, the main rubber element provides a bulging stiffness. At low frequencies, when fluid flows freely through the inertia track, the traditional hydromount's main spring still provides a significant static stiffness. For example, a typical hydromount may provide 100 N/mm or more of static stiffness. In the present design, the rolling boot 2 provides a significant stiffness only during high frequency bulging. At low frequencies, the rolling boot 2 rolls upon itself and adds negligible stiffness to the system. Preferably, the static stiffness is of the rolling boot is less than 50 N/mm, and more preferably the static stiffness is less than 10 N/mm and most preferably it is less than 1 N/mm. For the purposes of this application, the low frequency stiffness of the rolling boots, or the static stiffness, may be referred to as the low frequency or static stiffness of the variable volume chamber. The variable volume's static stiffness and the static stiffness effect of the low-pressure gas, which is present in some embodiments, combine to define the total static stiffness of the whole damping system. This is the total resistance to movement experienced by the tie rod due to the damping system at frequencies substantially below the tuned damping frequency. As will clear to those of skill in the art, this low frequency or static stiffness experienced by the tie rod due to the damping system is very small because the damping system does not resist the flow of fluid through the inertia track. Preferably, the total static stiffness or low frequency stiffness of the entire damping system is also less than 50 N/mm, and more preferably less than 10 N/mm, and may be as low as 1 N/mm or less. Additionally, the damping system's boots can undergo large strains with minimal rubber stress and thus cause negligible static stiffness increase. A hydromount's main spring, however, cannot undergo large strains without experiencing significant rubber stress and hence significant static stiffness effect.

Similarly, a damping system embodiment employing a piston/cylinder would have no rubber stress when the piston is stroked and hence would have no significant static stiffness. The static stiffness of a piston/cylinder system would be preferably under 20 N/mm, more preferably 10 N/mm, and most preferably under 1 N/mm.

The rolling boot 2 design of the hydraulically tuned steering damping system also differs functionally from an existing hydromount in that the main rubber element of a traditional hydromount cannot accommodate large deflections above 20 mm, and works optimally at deflections under 10 mm. The rolling boot 2 easily accommodates deflections of over 25 mm, and preferably over 50 mm, and more preferably above 100 mm. As will be clear to those of skill in the art, the maximum deflection is only limited by the boot travel, or the travel of an external cylinder, in embodiments using a cylinder to define a variable volume chamber or working chamber.

Typical maximum deflections are 100 mm, but could be as high as 250 mm or even as high as 2000 mm for some applications.

The working fluid 6 used in current hydromounts can be used in the hydraulically tuned steering damping system application. Other fluids may also be utilized which have different properties and lubrications through viscosity, density, etc. Power steering fluid, which is already used internally in the steering gear and is readily available in steering gear manufacturing facilities, presents another logical choice of working fluid 6.

Various forms of inertia track 4 have been shown. All of the inertia tracks have by definition, an area of $A_i$ and a length $L_i$. The compliant tuning member caused by the bulging of the boot 12, by an external diaphragm 16, or by integrating a diaphragm into the boot 20, has by definition, an area $A_d$ and is made of a compliant material. The compliant member does not need to be capable of handling large fluid displacements, since large displacements occur at relatively low frequencies where the fluid 6 is able to move through inertia track 4 at a rate that is sufficient to prevent excessive pressure build ups.

In the hydraulically tuned steering damping system it can be appreciated the amount of fluid 6 displaced from the collapsing working chamber 5 is equal to the area of an equivalent analogous piston times the distance that the piston moves. The hydraulic fluid is assumed to be incompressible.

At low frequencies, the displaced fluid volume flows through the inertia track and into the expanding collection volume formed by the other boot, or into a separate collection chamber. This occurs for large amplitude displacements as well as small amplitude displacements.

The cross-sectional area of the analogous piston is large with respect to the cross sectional area of the inertia track. Therefore, a unit displacement of the boot/piston requires a much larger displacement of fluid through the inertia track. The movement of fluid through the inertia track is increased with respect to the movement of the boot/piston. This scaling effect makes the few grams of the fluid in the inertia track appear to have a mass of many hundreds or thousands times larger. The gain is equal to:

system effective mass=((Area of Piston)/(Area of Inertia Track))$^2$×actual fluid mass where actual fluid mass=fluid density×Area of Inertia Track×Inertia Track Length A more generic way to express this equation is system effective mass=(($dV/dx$)/(Area of Inertia Track))$^2$×actual fluid mass where $dV/dx$ is the volume of fluid displaced from the working chamber per unit of length the boot is collapsed.

The scaling from the actual fluid mass to the system effective mass is typically over 200, and often over 2000.

At high frequencies, the inertial effects become quite large and the acceleration and therefore the displacement of the fluid in the inertia track approaches zero. A flexible diaphragm, such as caused by the boot's bulging stiffness, allows the effective mass in the inertia track to decouple from the moving piston. The volume change that accompanies the piston movement is taken up by deflection of the diaphragm. The deflecting diaphragm adds high frequency stiffness to the system. The area of the diaphragm may or may not be equivalent to the area of the piston or analogous piston, so that there may be a scaling effect as there was with the inertia track. The diaphragm introduces a gain that is equal to system effective stiffness=((Area of Piston)/(Area of Diaphragm))$^2$×diaphragm stiffness Again, a more generic way to express this equation is system effective stiffness=(($dV/dx$)/(Area of Diaphragm))$^2$×diaphragm stiffness where $dV/dx$ is the volume of fluid displaced from the working chamber per unit of length the boot is collapsed.

The diaphragm can only accommodate small volume changes. This is not an issue since at high frequencies, where diaphragm motion is necessary, the displacements are quite small. At low frequencies where displacements are high, the fluid moves through the inertia track and the diaphragm is not significantly deflected.

At a certain frequency, the effective mass of the fluid in the inertia track resonates on the effective stiffness of the diaphragm, thus achieving significant output motion even when excited with little input motion. This resonant frequency is designed to occur at or near the vehicle's steering nibble frequency. As the effective mass resonates, it transitions from in-phase motion to out-of-phase motion. During this transition, the effective mass oscillates with an approximate 90-degree phase lag with respect to the excitation. This generates an enormous amount of effective damping. This damping can be used to attenuate the chassis mode of interest.

The resonant frequency for the system is given by the formula:

system resonant frequency=(system effective stiffness/system effective mass)$^{1/2}$ The cross sectional area and length of the inertia track and the deflection stiffness of the diaphragm are chosen such that the system resonant frequency is generally at the chosen damping frequency. The resonant frequency for a steering system may be in the range of 10-25 Hz, or more preferably in a range of 10-15 Hz, though a damping system according to the present invention may be tuned to damp other frequencies.

Figure 9:
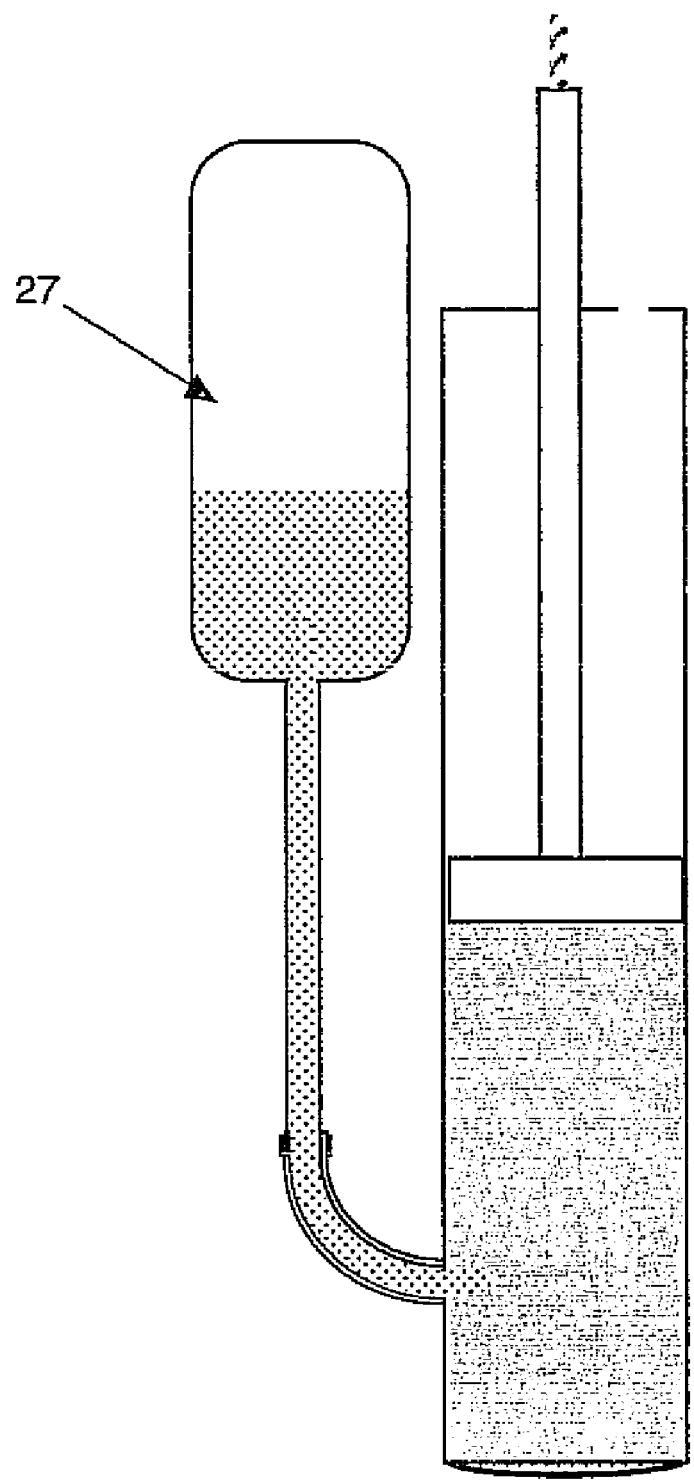
FIG. 9 is a schematic of a stand-alone piston/cylinder type hydraulically tuned damping system, which can be used for general application to attenuate frequency-specific vibration.

It can be appreciated that the type of bellows used in a traditional hydromount will not be adequate to accommodate the large volumetric changes experienced in a long stroke hydraulic tuned damper. This is true whether the long stroke hydraulically tuned damper is of the piston/cylinder type shown in FIG. 9 or boot type shown in FIG. 8. In the design of FIG. 9, the piston/cylinder defines the variable volume chamber. This approach provides a long stroke and low static stiffness similar to the boot version discussed earlier. The static stiffness of the piston/cylinder is less than 20 N/mm, and more preferably the static stiffness is less than 10 N/mm and most preferably it is less than 1 N/mm. For the purposes of this application, the stiffness of the piston/cylinder at low frequencies, or the static stiffness, may be referred to as the low frequency or static stiffness of the variable volume chamber. The variable volume's static stiffness and the static stiffness effect of the low-pressure gas, which is present in some embodiments, combine to define the total static stiffness of the whole damping system. This is the resistance to movement experienced by the tie rod due to the damping system at frequencies substantially below the tuned damping frequency. The piston/cylinder easily accommodates deflections of over 25 mm, and preferably over 50 mm, and more preferably above 100 mm. As will be clear to those of skill in the art, the maximum deflection is only limited by the piston travel. Typical maximum deflections are 100 mm, but could be as high as 250 mm or even as high as 2000 mm for some applications.

One method of accommodating large volumetric changes without adding significant stiffness is to partially fill the fluid collection chamber with a compressible low-pressure gas 27 and 26.

Figure 10:
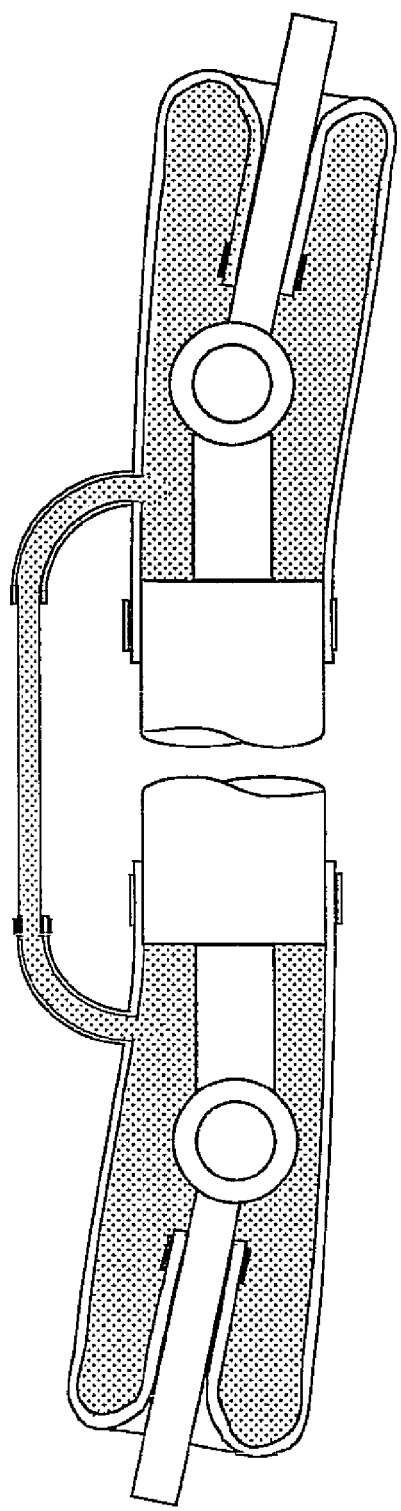
FIG. 10 is a schematic of a boot type hydraulically tuned damping system having multiple boots, where a second opposed boot acts as the fluid collection chamber for the first boot.
Figure 11:
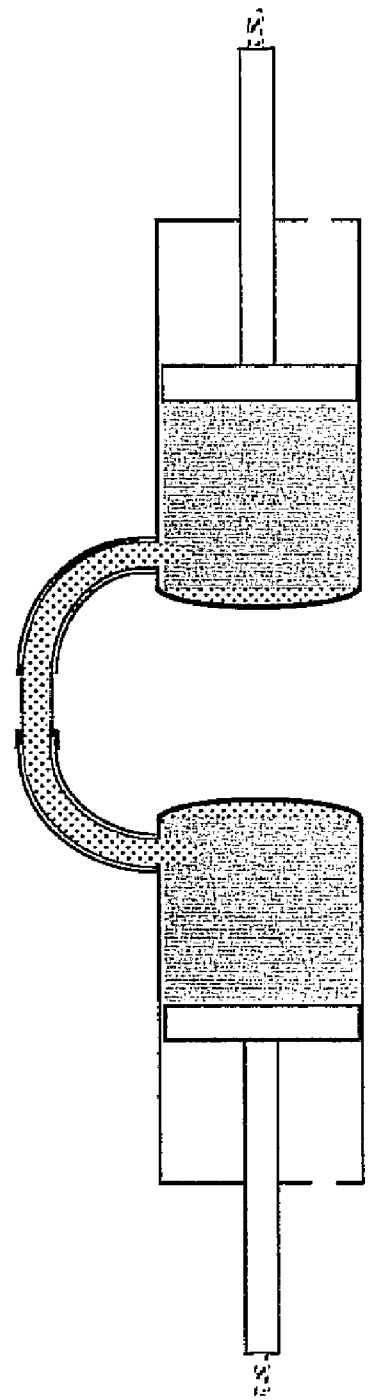
FIG. 11 is a schematic of a piston/cylinder type hydraulically tuned damping system having multiple boots, where a second cylinder acts as the fluid collection chamber for the first cylinder.

Another method is to attach two long stroke hydraulically tuned dampers in an opposing arrangement, as shown in FIGS. 10 and 11. The two devices are arranged such that the volume of collapse in the first chamber is equal to the volume of expansion in the second chamber when the system is given a linear displacement input. Therefore, each device functions as a collection chamber for the other.

Long stroke hydraulically tuned dampers can also be used for applications other than steering nibble. One example application is for damping of brake roughness. By placing hydraulically tuned dampers according to the present invention at the lower control arm bushing locations, the longitudinal vibration energy from the brake system can be attenuated. Long stroke hydraulically tuned dampers for other applications are similar to the above described embodiments in that they include a variable volume chamber interconnected with the mechanism, an inertia track connected to the chamber, a collection chamber connected to the other end of the inertia track, and a compliant tuning member or diaphragm in fluid communication with the variable volume chamber. The dampers are designed in accordance with the above teachings, and may be used to damp a variety of frequencies.

Although various preferred embodiments of the present invention have been described herein in detail, it will be appreciated by those skilled in the art that variations may be made thereto without departing from the spirit of the invention or the scope of the appended claims.

We claim:

1. A damping system for use with a mechanism having a first element which moves toward and away from a second element, the damping system being tuned to at least partially damp a chosen frequency, the system comprising:

a variable volume chamber in mechanical communication with the mechanism such that movement of the first element in a first direction with respect to the second element reduces the volume of the chamber and movement of the first element in an opposite second direction with respect to the second element increases the volume of the chamber;

a collection chamber;

an inertia track having a first end in fluid communication with the variable volume chamber and an opposed second end in fluid communication with the collection chamber, the inertia track having a cross sectional area and a length;

a fluid disposed in the variable volume chamber, the inertia track and at least a portion of the collection chamber, the fluid having a fluid density;

a gas disposed in at least a portion of the collection chamber;

a volume of fluid being displaced into or from the variable volume chamber by movement of the first element relative to the second element whereby the gas disposed in the collection chamber is compressed and expanded, the volume of fluid displaced per unit of movement being defined as $dV/dx$;

an actual fluid mass for the inertia track being given by the formula;

actual fluid mass=(cross sectional area)×(length)×fluid density;

the system having a system effective mass given by the formula;

system effective mass=$((dV/dx)/$(cross sectional area)$)^2$×actual fluid mass;

a compliant tuning member in fluid communication with the chamber, the compliant tuning member having a deflection stiffness and an area;

the system having a system effective stiffness given by the formula;

system effective stiffness=$((dV/dx)/$(Area of compliant member)$)^2$×deflection stiffness;

the system having a resonant frequency given by the formula;

system resonant frequency=(system effective stiffness/system effective mass)$^{1/2}$;

the cross sectional area and length of the inertia track and the deflection stiffness of the compliant tuning member being chosen such that the system resonant frequency is generally at the chosen frequency.

2. The damping system according to claim 1, further comprising a boot defining at least a portion of the variable volume chamber.

3. The damping system according to claim 2, wherein the compliant tuning member forms at least a part of the boot.

4. The damping system according to claim 3, wherein the compliant tuning part of the boot has a stiffness substantially lower than the remainder of the boot.

5. The damping system according to claim 4, wherein at least a portion of the remainder of the boot is fiber reinforced.

6. The damping system according to claim 2, wherein the boot is a rolling boot.

7. The damping system according to claim 2, wherein the compliant tuning member is a diaphragm.

8. The damping system according to claim 7, further comprising a diaphragm housing in fluid communication with the variable volume chamber, the diaphragm forming a portion of the diaphragm housing.

9. The damping system according to claim 8, wherein the boot has a bulging stiffness and the diaphragm has a deflection stiffness substantially lower than the bulging stiffness of the boot.

10. The damping system according to claim 1, wherein the mechanism is a steering system, the first element is a tie rod, and the second element is a steering gear housing.

11. The damping system according to claim 10, further comprising a boot defining at least a portion of the variable volume chamber, the boot having a first portion connected to the steering gear housing and a second portion connected to the tie rod.

12. The damping system according to claim 11, wherein the boot is a rolling boot.

13. The damping system according to claim 10, wherein the steering gear is of the type further having a second tie rod which moves towards and away from the steering gear, the system further comprising:

a second boot defining at least a portion of a second variable volume chamber, the second boot having a first portion connected to the steering gear and a second portion connected to the second tie rod such that movement of the tie rod toward the steering gear reduces the volume of the second variable volume chamber and movement of the tie rod away from the steering gear increases the volume of the variable volume chamber;

a second inertia track having a first end in fluid communication with the second variable volume chamber and an opposed second end;

a second collection chamber in fluid communication with the second end of the second inertia track;

a second compliant tuning member in fluid communication with the second working chamber; and a fluid disposed in the second working chamber, the second inertia track, and at least a portion of the second collection chamber.

14. The damping system according to claim 13, wherein the inertia tracks each have a cross sectional area and a length, the area and length of the tracks being the same.

15. The damping system according to claim 13, wherein the inertia tracks each have a cross sectional area and a length, the area and/or lengths of the tracks being different from each other.

16. The damping system according to claim 1, wherein the system effective mass is at least 100 times the actual fluid mass.

17. The damping system according to claim 16, wherein the system effective mass is at least 200 times the actual fluid mass.

18. The damping system according to claim 1, wherein the system resonant frequency is in the range of 10-25 Hz.

19. The damping system according to claim 1, further comprising a cylinder and a piston disposed therein, the cylinder and piston cooperating to define the variable volume chamber.

20. The damping system according to claim 1, wherein the mechanism is a viscous and/or coulomb damping system.

21. A damping system for use with a mechanism having a first element which moves toward and away from a second element, the damping system being tuned to at least partially damp a chosen frequency, the system comprising:

a cylinder with a piston disposed therein, the cylinder and piston cooperating to define a variable volume chamber in mechanical communication with the mechanism such that movement of the first element in a first direction with respect to the second element reduces the volume of the chamber and movement of the first element in an opposite second direction with respect to the second element increases the volume of the chamber, the variable volume chamber having a stroke sufficient to allow displacements of the first element relative to the second element of at least 100 mm;

a collection chamber;

an inertia track having a first end in fluid communication with the variable volume chamber and an opposed second end in fluid communication with the collection chamber, the inertia track having a cross sectional area and a length;

a fluid disposed in the variable volume chamber, the inertia track and at least a portion of the collection chamber, the fluid having a fluid density;

a volume of fluid being displaced into or from the variable volume chamber by movement of the first element relative to the second element, the volume displaced per unit of movement being defined as dV/dx;

an actual fluid mass for the inertia track being given by the formula;

actual fluid mass=(cross sectional area)×(length)×fluid density;

the system having a system effective mass given by the formula;

system effective mass=$((dV/dx)/$(cross sectional area$))^2$×actual fluid mass;

a compliant tuning member in fluid communication with the chamber, the compliant tuning member having a deflection stiffness and an area;

the system having a system effective stiffness given by the formula;

system effective stiffness=$((dV/dx)/$(Area of compliant member$))^2$×deflection stiffness;

the system having a resonant frequency given by the formula;

system resonant frequency=(system effective stiffness/ system effective mass$)^{1/2}$;

the cross sectional area and length of the inertia track and the deflection stiffness of the compliant tuning member being chosen such that the system resonant frequency is generally at the chosen frequency.

22. A damping system according to claim 21, wherein the mechanism is a viscous and/or coulomb damping system.

23. A damping system for use with a mechanism having a first element which moves toward and away from a second element, the damping system being tuned to at least partially damp a chosen frequency, the system comprising:

a cylinder with a piston disposed therein, the cylinder and piston cooperating to define a variable volume chamber in mechanical communication with the mechanism such that movement of the first element in a first direction with respect to the second element reduces the volume of the chamber and movement of the first element in an opposite second direction with respect to the second element increases the volume of the chamber, a collection chamber;

an inertia track having a first end in fluid communication with the variable volume chamber and an opposed second end in fluid communication with the collection chamber, the inertia track having a cross sectional area and a length;

a fluid disposed in the variable volume chamber, the inertia track and at least a portion of the collection chamber, the fluid having a fluid density;

a volume of fluid being displaced into or from the variable volume chamber by movement of the first element relative to the second element, the volume displaced per unit of movement being defined as dV/dx;

an actual fluid mass for the inertia track being given by the formula;

actual fluid mass=(cross sectional area)×(length)×fluid density;

the system having a system effective mass given by the formula;

system effective mass=$((dV/dx)/$(cross sectional area$))^2$×actual fluid mass;

a compliant tuning member in fluid communication with the chamber, the compliant tuning member having a deflection stiffness and an area;

the system having a system effective stiffness given by the formula;

system effective stiffness=$((dV/dx)/$(Area of compliant member$))^2$×deflection stiffness;

the system having a resonant frequency given by the formula;

system resonant frequency=(system effective stiffness/ system effective mass$)^{1/2}$;

wherein the cross sectional area and length of the inertia track and the deflection stiffness of the compliant tuning member are chosen such that the system resonant frequency is generally at the chosen frequency;

wherein the stiffness of the variable volume chamber at frequencies substantially below the chosen frequency is less than 50 N/mm.

24. A damping system according to claim 23, wherein the mechanism is a viscous and/or coulomb damping system.

25. A damping system for use with a steering system having a steering gear and a tie rod which moves toward and away from the steering gear to cause movement of a vehicle wheel, the steering system further having a steering gear housing, the damping system being tuned to at least partially damp a chosen frequency, the system comprising:

a variable volume chamber disposed inside the steering gear housing, the chamber being in mechanical communication with the steering gear and the tie rod such that movement of the tie rod in a first direction with respect to the steering gear reduces the volume of the chamber and movement of the tie rod in an opposite second direction with respect to the steering gear increases the volume of the chamber;

a collection chamber;

an inertia track having a first end in fluid communication with the variable volume chamber and an opposed second end in fluid communication with the collection chamber, the inertia track having a cross sectional area and a length;

a fluid disposed in the variable volume chamber, the inertia track and at least a portion of the collection chamber; and a compliant tuning member in fluid communication with the chamber, the flexible tuning member having a deflection stiffness;

the cross sectional area and length of the inertia track and the deflection stiffness of the compliant tuning member being chosen such that the system damps movement of the tie rod relative to the steering gear generally at the chosen frequency.

26. The damping system according to claim 25, further comprising a cylinder and a piston disposed therein, the cylinder and piston cooperating to define the variable volume chamber.

* * * * *

UNITED STATES PATENT AND TRADEMARK OFFICE
CERTIFICATE OF CORRECTION

| | | |
|---|---|---|
| PATENT NO. | : 7,806,420 B2 | Page 1 of 1 |
| APPLICATION NO. | : 12/363005 | |
| DATED | : October 5, 2010 | |
| INVENTOR(S) | : Alexander Gorodisher et al. | |

It is certified that error appears in the above-identified patent and that said Letters Patent is hereby corrected as shown below:

On the Title Page Item (75) Inventors: replace "Alex Gorodisher" with --Alexander Gorodisher--.

Signed and Sealed this
Twenty-ninth Day of November, 2011

David J. Kappos
*Director of the United States Patent and Trademark Office*